US005107292A

United States Patent [19]

Tanaka et al.

[11] Patent Number: 5,107,292

[45] Date of Patent: Apr. 21, 1992

[54] ELECTRONIC FLASH UNIT

[75] Inventors: Kazuo Tanaka, Neyagawa; Shinji Hirata, Toyonaka, both of Japan

[73] Assignee: West Electric Co., Ltd., Osaka, Japan

[21] Appl. No.: 675,962

[22] Filed: Mar. 27, 1991

[30] Foreign Application Priority Data

Apr. 13, 1990 [JP] Japan .............................. 2-099506
May 30, 1990 [JP] Japan .............................. 2-140975

[51] Int. Cl.[5] .............................. G03B 7/00

[52] U.S. Cl. .............................. 354/416; 354/145.1; 315/241 P

[58] Field of Search .............................. 354/413-424, 354/135, 145.1, 149.11; 315/241 R, 241 P, 241 S

[56] References Cited

U.S. PATENT DOCUMENTS 4,839,686 6/1989 Hosomizu et al. .............................. 354/416
4,999,663 12/1989 Nakamura .............................. 354/415

*Primary Examiner*—L. T. Hix
*Assistant Examiner*—David M. Gray
*Attorney, Agent, or Firm*—Stevens, Davis, Miller & Mosher

[57] ABSTRACT

In an electronic flash unit, a voltage applying device is provided to apply a predetermined voltage to the gate of an insulated gate bipolar transistor (IGBT), connected in series with a flash tube, for controlling the light-emission operation of the flash tube. The voltage applying device produces the predetermined voltage in response to the start of the operation of a DC high voltage power source. Thus, the voltage applying device applies a driving voltage to the gate of the IGBT without responding to a light-emission command signal. The IGBT enters a conduction standby state in response to the start of the operation of the DC high voltage power source, and is placed in a fully 'on' state when a trigger circuit is operated by the light-emission command signal. The driving voltage can be applied to the gate in a very simple arrangement which does not require to respond to the trigger signal.

15 Claims, 5 Drawing Sheets

ELECTRONIC FLASH UNIT

BACKGROUND OF THE INVENTION

1. Field of the Invention

The present invention relates to an electronic flash unit having an insulated gate bipolar transistor (IGBT) which is connected in series with a flash tube and serves to control the light-emission from the tube, and more particularly to a flash unit having a simiplified drive control system for the IGBT.

2. Description of the Related Art

One of previously known flash units provided with the above IGBT is disclosed in U.S. Pat. No. 4,839,686.

As shown in FIG. 8, this flash unit is composed of a DC high voltage power source 1 which is a known DC—DC converter circuit, a main capacitor 2 which will be charged by the power source 1, a constant voltage circuit 3, attached to the power source 1, for supplying a constant voltage to a light-emission control circuit 7 described later, a known trigger circuit 4 for triggering the flash tube 5, a control circuit 6 which is connected with control means 8 incorporated in a camera body so that several kinds of signals are transferred between them thereby producing several kinds of output signals such as a trigger signal for operating the trigger circuit 4, a light-emission control circuit 7 for on-off controlling an IGBT connected in series with the flash tube 5 to control the light-emission from the flash tube 5, and a double voltage circuit 9 for applying a doubled voltage to the flash tube 5.

In operation, when a switch SW is switched on, the DC high voltage power source 1 operates to charge the main capacitor 2 and a double voltage capacitor 9a in their polarity indicated. At the same time, a DC low voltage power source E charges a power supply capacitor C for the control circuit 6, and the above DC high voltage power source also charges a capacitor 3a incorporated in the constant voltage source 3.

If with each of these capacitors charged, the control means 8 supplies a light-emission starting command signal to the control circuit 6, the control circuit 6 will produce, from its one output terminal Oa, a trigger signal at a high level for a predetermined period in which the longest light emitting period of the flash tube 5 is considered. And when the light-emission starting command signal is supplied, the other output terminal Ob of the control circuit 6 is held at a low level so that a transistor Qc remains off. Thus, transistors Qa and Qb turn on, and the charging voltage of the capacitor 3a is applied to the gate of the IGBT so that the IGBT turns on.

When the IGBT turns on, the known trigger circuit 4 operates to excite the flash tube 5 and also the (+) side of the double voltage capacitor 9a is grounded through a resistor R1 and the IGBT; the charged energy of the double voltage capacitor 9a is superposed on that of the main capacitor 2 so that the charged energy thus prepared will be supplied to the flash tube 5. Accordingly, the flash tube 5 emits light by consuming the charged energy in the main capacitor 2.

If in the course of emitting light, a photometer circuit incorporated in the control means 8, for example, supplies a light-emission stopping command pulse to the control circuit 6, the control circuit 6 will produce a high level light-emission stopping signal from its output terminal Ob, and the transistors Qc and Qd turn on. Thus, the transistor Qa is short-circuited between its base and emitter and the IGBT is short-circuited in its gate and emitter so that these transistors turn off. Then, the transistor Qb also turns off and the flash tube 5 stops emitting light.

The operation described above is a basic operation of the flash unit as shown in FIG. 8. This flash unit can obviate excess of light-emission in contrast to the flash unit which stops emitting light using a terminating capacitor, and can repeatedly emit light at a high speed.

However, the conventional flash unit as shown in FIG. 8 has the following disadvantages.

The system of driving the IGBT operates in response to both a trigger signal and a light-emission stopping signal so that the means 7 for controlling the voltage supply to the gate of the IGBT is required. Namely, as seen from FIG. 8, the control switch arrangement composed of the transistors Qa to Qc, etc. is required. This results in a complicated circuit construction of the flash unit, which leads to high production cost.

Further, since the trigger circuit 4 starts to operate in response to the trigger signal, and simultaneously the charging voltage is applied to the gate of the IGBT, the trigger circuit 4 may operate before the IGBT has fully turned on. Then, the IGBT is in a high impedance state; this deteriorates the operation efficiency of the trigger circuit 4 so that the flash tube 5 may fail to emit light. Even if the flash tube 5 can emit light, the energy (charged energy) supplied from the main capacitor may destroy the IGBT. In short, in some cases, the operating timing of the trigger circuit 4 provides inconveniences of lowering the operation efficiency and braking the IGBT.

SUMMARY OF THE INVENTION

An object of the present invention is to provide a flash unit which is provided with voltage applying means for supplying a driving voltage to the gate of an IGBT operating in synchronism with the operation of a DC high voltage power source and connected in series with a flash tube (e.g. Xe lamp).

Another object of the present invention is to provide a flash unit which is able to place an IGBT connected in series with a flash tube in a conduction standby state in such a manner that the IGBT does not respond to a trigger signal for operating a trigger circuit, and able to drive the IGBT in a stabilized manner irrespective of the operating timing of the trigger circuit.

A still another object of the present invention is to provide a flash unit which is able to quickly supply, using voltage applying means, a driving voltage to the gate of the IGBT to improve the switching characteristic of the IGBT, which is connected in series with the flash tube, and operates in synchronism with the operation of a DC high voltage power source.

Other objects and advantages of the present invention will become apparent from the following detailed description of the preferred embodiments of the invention taken in conjunction with the accompanying drawings.

DESCRIPTION OF THE PREFERRED EMBODIMENTS

Figure 1:
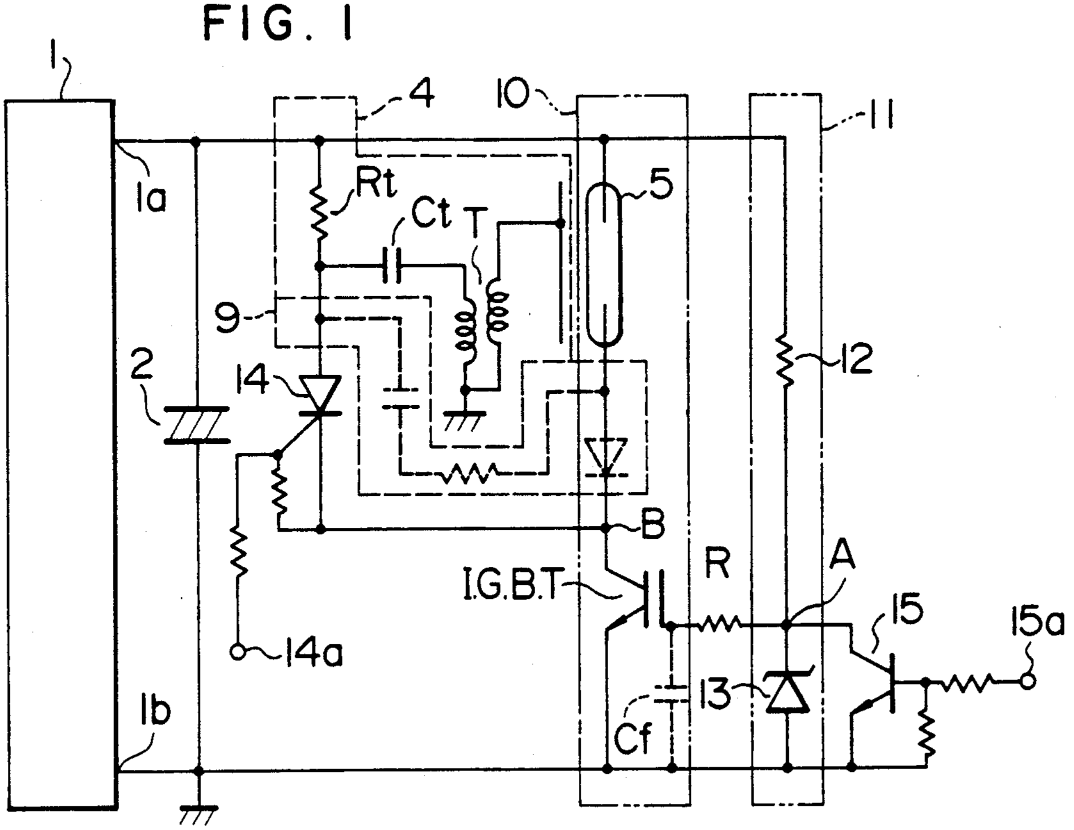
FIG. 1 is an electric circuit diagram showing the first embodiment of a flash unit according to the present invention.

Now referring to the drawings, several embodiments of the present invention will be explained.

Embodiment 1

FIG. 1 is a circuit diagram showing the first embodiment of a flash unit accoridng to the present invention.

The arrangement of this embodiment is as follows.

Figure 8:
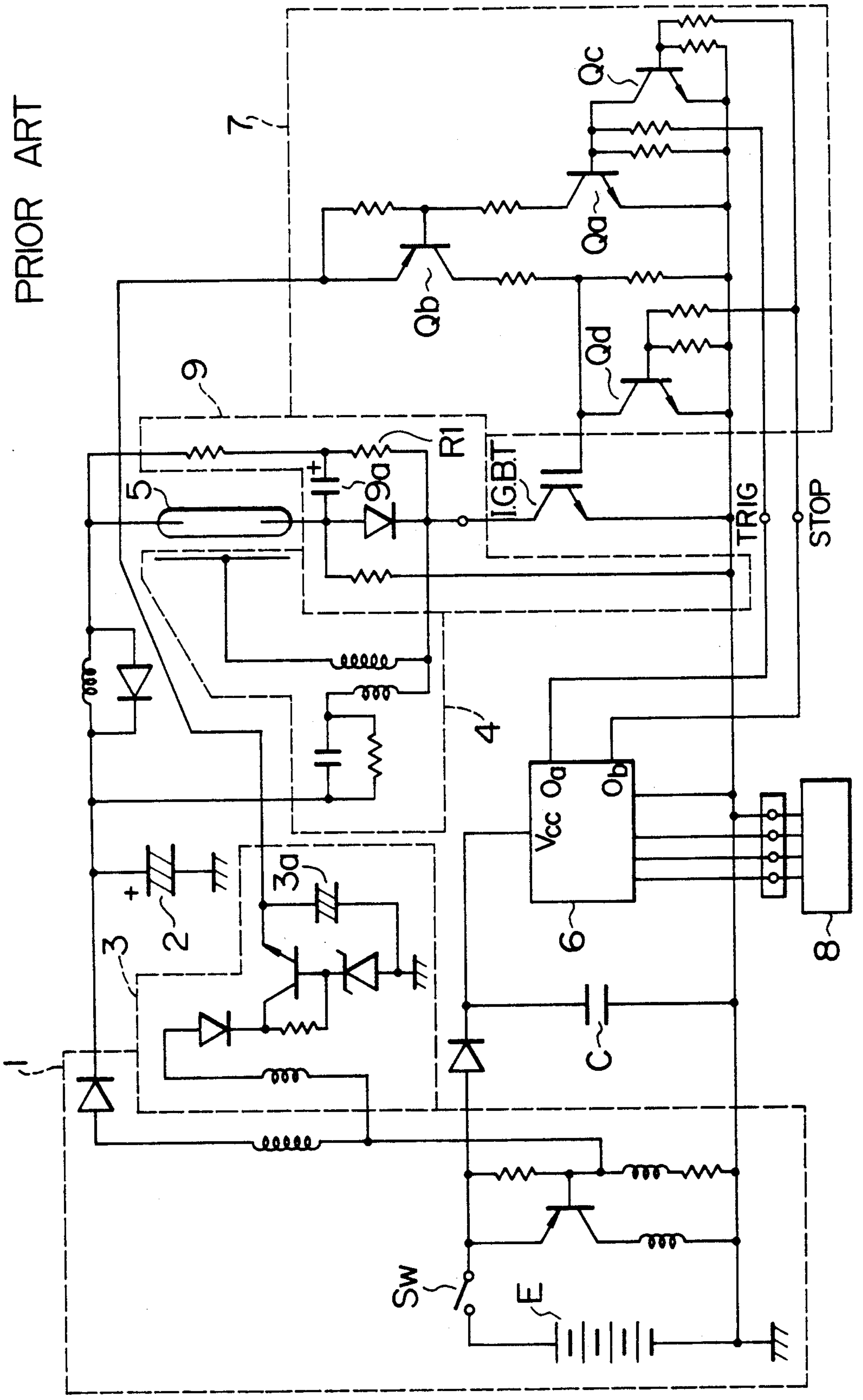
FIG. 8 PRIOR ART
FIG. 8 is an electric circuit diagram showing an example of the flash unit disclosed in U.S. Pat. No. 4,839,686.

In FIG. 1, the same reference numerals refer to the same elements as in FIG. 8. In FIG. 1, a main capacitor 2 is connected across a DC high voltage power source 1 such as a known DC—DC converter circuit or a laminated battery. Connected across the main capacitor 2 are a series connection 10 of a flash tube 5 and an IGBT, and voltage applying means 11 composed of a resistor 12 and a Zener diode 13 connected in series. Connected across the flash tube 5 is a series connection of a resistor Rt for charging a trigger capacitor Ct located in a trigger circuit 4 and an SCR 14 which is a trigger switch for operating the trigger circuit 4 through its turn-on operation. Thus, the cathode of the SCR 14 which is a lower potential side terminal is connected with a junction B of the flash tube 5 and the IGBT. A junction A of the resistor 12 and the Zener diode 13 is connected with the gate of the IGBT through a resistor R. Connected between the junction A and ground is a transistor 15 serving as control means turning off the IGBT through its turn-on. A light-emission starting command signal which instructs to start the light-emission is applied to the gate 14*a* of the SCR 14 whereas a light-emission stopping command signal which instructs to stop the light-emission is applied to the base 15*a* of the transistor 15. Additionally, it is apparent that a double voltage circuit 9 composed of a capacitor, a resistor and a diode encircled by a broken line in FIG. 1 can be provided in the same manner as in the conventional flash unit as shown in FIG. 8.

Figure 2:
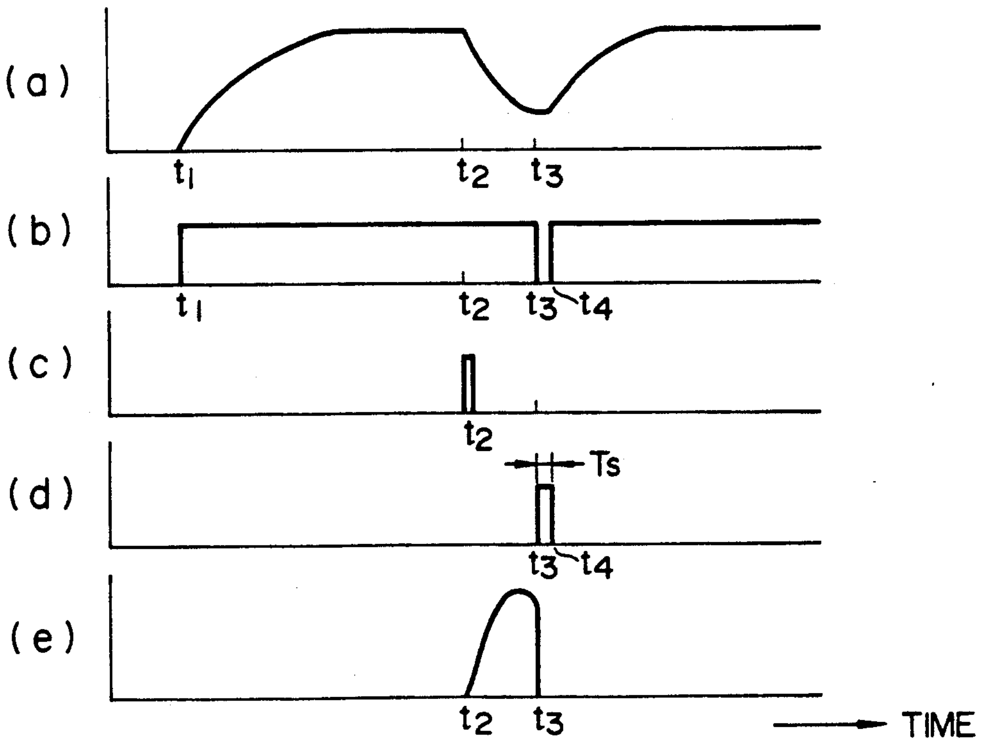
FIG. 2 is a waveform chart showing the waveforms formed at predetermined points in the circuit shown in FIG. 1.

The operation of the flash unit according to this embodiment having the arrangement described above will be explained with reference to FIG. 2 showing the signal waveforms at predetermined points in the circuit shown in FIG. 1.

It is assumed that at a timing t1 when a power switch (not shown) is closed, the DC high voltage power source 1 starts to operate. Then, a DC high voltage produced between output terminals 1*a* and 1*b* starts to charge the main capacitor 2 and other capacitors. For example, the terminal voltage across the main capacitor 2 starts to increase as shown in FIG. 2A. The DC high voltage, which is also applied to the voltage applying means 11, produces a predetermined voltage across the Zener diode as shown in FIG. 2B. This predetermined voltage is applied across the gate and emitter of the IGBT through the resistor R. The IGBT, to the gate of which the predetermined voltage has been applied at the timing t1, enters a conduction standby state.

It is assumed that at a timing t2 when the capacitor 2 has been charged, a high level pulse signal as shown in FIG. 2C which is a light-emission command signal is applied to the gate 14*a* of the SCR 14. Then, the SCR 14 turns on because the IGBT is in the conduction standby state. Thus, the charged energy in the trigger capacitor Ct is discharged through the SCR 14 and a trigger transformer T, namely the trigger circuit 4 operates so that the flash tube 5 is excited. The flash tube 5 starts to emit light by consuming the charged energy in the main capacitor 2, as shown in FIG. 2E.

If, at a timing t3 which is an optional timing when the flash tube 5 emits light, the amount of light-emission is appropriate, a high level pulse signal having a predetermined pulse width Ts as shown in FIG. 2D which is a light-emission stopping command signal is applied to the base 15*a* of the transistor 15 from a photometer circuit (not shown). Then, the transistor 15 remains 'on' during the period Ts. Thus, the gate-emitter of the IGBT is short-circuited through the resistor R so that the gate potential is decreased to the level as shown in FIG. 2B which does not permit the IGBT to remain 'on'. As a result, the IGBT turns off at the timing t3. When the IGBT turns off, the discharging current which has been flowing through the flash tube 5 is cut off so that the light-emission from the flash tube 5 stops at the timing t3 as shown in FIG. 2E.

Now it should be noted that the cathode, i.e. lower potential side terminal of the SCR 14 is connected with the collector of the IGBT. For this reason, when the IGBT turns off, the current loop flowing through the SCR 14 is cut off thereby to surely turn off the SCR 14. This measn that it is possible to turn off the SCR 14 without considering its holding current which is very important to permit the flash tube 5 to emit light at a high speed. As described above, in this embodiment, the lower potential terminal of the trigger switch (SCR 14) is connected with the junction B of the flash tube 5 and the IGBT (hence, the collector of the IGBT) so that the SCR 14 can be surely turned off when the IGBT is turned off. Therefore, the trigger circuit 4 can be instantaneously prepared for the subsequent light-emission; this permits the high speed light-emission function of the flash tube 5 to be realized.

Thereafter, if at a timing t4 when the above predetermined time Ts has elapsed, the light-emission stopping command signal disappears, the transistor 15 is returned from 'on' to 'off'. Thus, the short-circuiting of the gate-emitter of the IGBT is released, and the voltage applying means 11 applies the driving voltage to the gate of the IGBT again. Thus, the flash unit returns to the initial state before light-emission to complete one round light-emission operation.

The period Ts during which the light-emission stopping command pulse signal is produced will be further explained. If a single light-emission is desired, in order to prevent glow-discharge, it is necessary to consider a de-ionized time of the flash tube 5 for each light-emission. In the case of the single light-emission, the pulse width Ts of the above pulse must be longer than the de-ionized time. On the other hand, in the case where high speed multiple light-emissions are desired, the above consideration will be rather inappropriate. Specifically, if the above pulse width Ts is set for the individual light-emission, desired number of times of light-emission cannot be attained for a given time. Therefore, in this case, in order to prevent the glow-discharge, the pulse width Ts of the above pulse relative to the above-mentioned de-ionized time should be considered for only the final light-emission.

Embodiment 2

Figure 3:
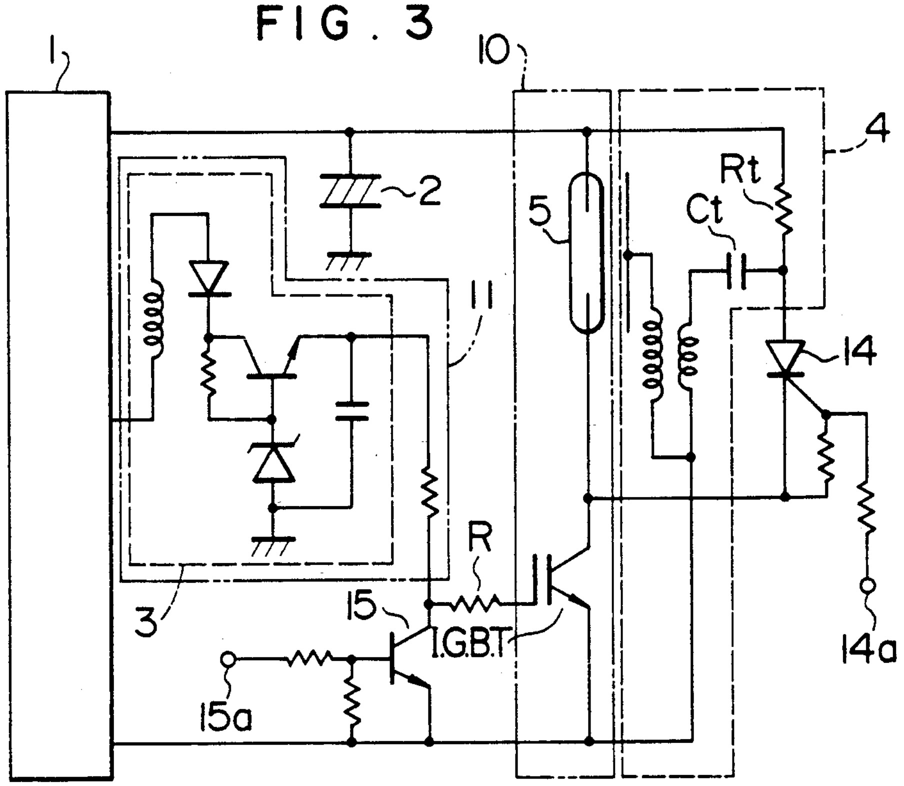
FIG. 3 is an electric circuit diagram showing the second embodiment of a flash unit according to the present invention.

FIG. 3 is an electric circuit diagram of the second embodiment of the flash unit according to the present invention. In FIG. 3, the same reference numerals refer to the same elements as in FIG. 1. This embodiment is different from the first embodiment of FIG. 1 in only that the main capacitor 2 which is the power source for the voltage applying means 11 in FIG. 1 is replaced by the low voltage power source such as the constant voltage circuit 3 mentioned in connection with the prior art of FIG. 8. Namely, in this embodiment, only the source for supplying the driving voltage to the IGBT is different from that in the first embodiment so that the operation of the flash unit is the same as that in the first embodiment.

Specifically, in FIG. 3, the DC high voltage power source 1 operates to start to charge the main capacitor 2 and other capacitors. At the same time, the constant voltage circuit 3 also operates to apply the predetermined voltage to the IGBT so that the IGBT enters the conduction standby state. When the trigger circuit 4 operates in response to the light-emission command signal supplied to the gate 14*a* of the SCR 14, the flash tube 5 emits light by consuming the charged energy in the main capacitor 2. When the transistor 15 turns on in response to the light-emission stopping command signal supplied to the base 15*a* of the transistor 15 in the course of light-emission, the gate-emitter of the IGBT is short-circuited so that the flash tube 5 stops the light-emission. When the light-emission stopping command signal disappears, the flash unit returns to the initial state before light-emission to complete one round of light-emission operation. The operation of the flash unit in this embodiment described above is entirely the same as that in the first embodiment of FIG. 1.

Embodiment 3

Figure 4:
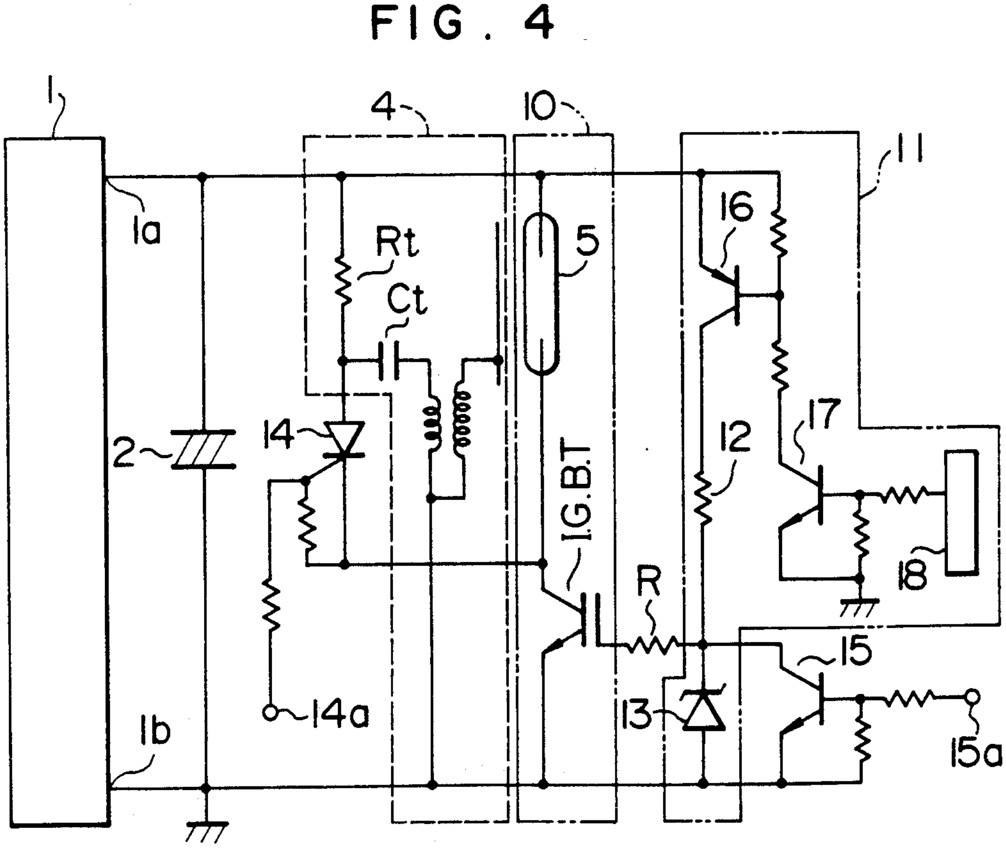
FIG. 4 is an electric circuit diagram showing the third embodiment of a flash unit according to the present invention.

FIG. 4 is an electric circuit diagram of the third embodiment of the flash unit according to the present invention. In FIG. 4, the same reference numerals refer to the same elements as in FIG. 1. This embodiment is characterized in that the voltage applying means 11 includes, in addition to the resistor 12 and the Zener diode 13, a transistor 16 serving as a switch, another transistor 17 for controlling the operation of the transistor 16 and control means 18 for on-off controlling the transistor 17.

The transistor 16 turns on when the transistor 17 turns on, thus providing the state where a voltage can be applied to the gate of the IGBT. In this embodiment, therefore, the timing of applying the voltage to the gate of the IGBT can be controlled by the transistors 16 and 17 which are controlled by the control means 18.

Specifically, when in synchronism with start of the operation of the DC high voltage power source 1, the control means 18 supplies a high level signal to the base of the transistor 17, and the transistor 17 turns on. Hence, the transistor 16 also turns on so that the flash unit is placed in the same circuit state as in th first embodiment of FIG. 1. Thus, the voltage applying means 11 operates to apply a predetermined voltage to the gate of the IGBT so that the IGBT enters a conduction standby state.

On the other hand, when with the voltage applied to the gate of the IGBT, the control means 18 supplies a low level signal to the base of the transistor 17, and the transistor 17 turns off. Hence, the transistor 16 also turns off so that the voltage applying means 11 stops its operation. As a result, the application of the predetermined voltage to the base of the IGBT is stopped. For this reason, if the control means 18 supplies the low level signal in synchronism with the 'automatic-off operation' which, in order to prevent excess power consumption, causes the DC high voltage power source 1 to stop its operation after a predetermined time has elapsed from the time when the flash unit has started to operate, a discharge loop for the main capacitor 2 through the voltage applying means 11, which has stopped its operation, will not be formed. Therefore, the terminal voltage across the main capacitor 2 remains its high level for a predetermined period after the automatic-off operation. Thus, since the energy to be supplied from the main capacitor 2 can be efficiently used, the main capacitor 2 can be charged for a very short time for the subsequent light-emission.

Additionally, in the state where the transistor 16 remains 'on' and so the voltage applying means 11 is operating, the flash tube 5 emits light in response to the light-emission command signal and also stops the light-emission in response to the light-emission stopping command signal. Such an operation is entirely the same as in the previous first and second embodiments.

Meanwhile, in the flash unit according to the respective embodiments of FIGS. 1, 3 and 4, the application of a predetermined voltage to the gate of the IGBT is done by the voltage applying means 11 when the DC high voltage power source starts to operate but without responding to the trigger signal (light-emission command signal). Therefore, no means for responding to the trigger signal is required and so the voltage application to the gate of the IGBT can be simplified. Further, since the IGBT is placed in the conduction standby state before the trigger signal (light-emission command signal) is supplied, the IGBT is necessarily in a sufficient 'on' state when the trigger circuit operates. Thus, the operation efficiency of the trigger circuit will not be deteriorated and no fear of destroying the IGBT will occur. In other words, the IGBT can be operated in a stabilized manner irrespective of the operating timing of the trigger circuit.

The embodiments of FIGS. 1, 3 and 4 have the advantages described above. However, it has been found as a result of careful study of these embodiments that following inconveniences may occcur with respect to the switching characteristic under the condition of a high speed repetitive light-emission operation.

It is needless to say that starting the light-emission can be performed by applying a driving voltage to the gate of the IGBT from the voltage applying means 11 and also operating the trigger circuit. But it should be noted that microscopically, an input capacitance Cf as indicated by a broken line is located between the gate and emitter of the IGBT. Therefore, the driving voltage is applied to the gate of the IGBT only after the input capacitance Cf has been charged.

On the other hand, stopping the light-emission can be performed by short-circuiting the gate-emitter of the IGBT when the transistor 15 turns on. Then, the input capcitance Cf will be also discharged. Thus, in order to start the light-emission again, the above input capacitance Cf must be charged fist. In the circuit as shown in FIG. 1, the input capacitance Cf is charged by the main capacitor 2 through the resistor. This charging requires a time constant which depends on the resistance of the resistor 12 and the value of the input capacitance Cf.

The above time constant is desired to be as small as possible in order to repeat the light-emission at a high speed. However, the resistor 12 is ordinarily connected with the main capacitor 2 through the Zener diode 13, and also through the transistor 15 while the transistor 15 remains 'on'. Therefore, setting the resistance for a small value is disadvantageous from the viewpoint of efficiently using the energy supplied from the main capacitor 2; actually the resistance of the resistor 12 must be set for a relatively high value. As a result, the circuit of FIG. 1 cannot reduce the above time constant to less than a certain level, and so have a certain limit in making the above switching characteristic steep. Further, it is apparent that the above time constant depends on the charging voltage of the main capacitor 2, variations in the accuracy of circuit elements, etc.

Accordingly, if a high speed repetitive light-emission operation is intended for the flash unit of FIG. 1, the period of light-emission will be limited by the above time constant, and also making the period shorter may result in a more unstable operation.

Figure 5:
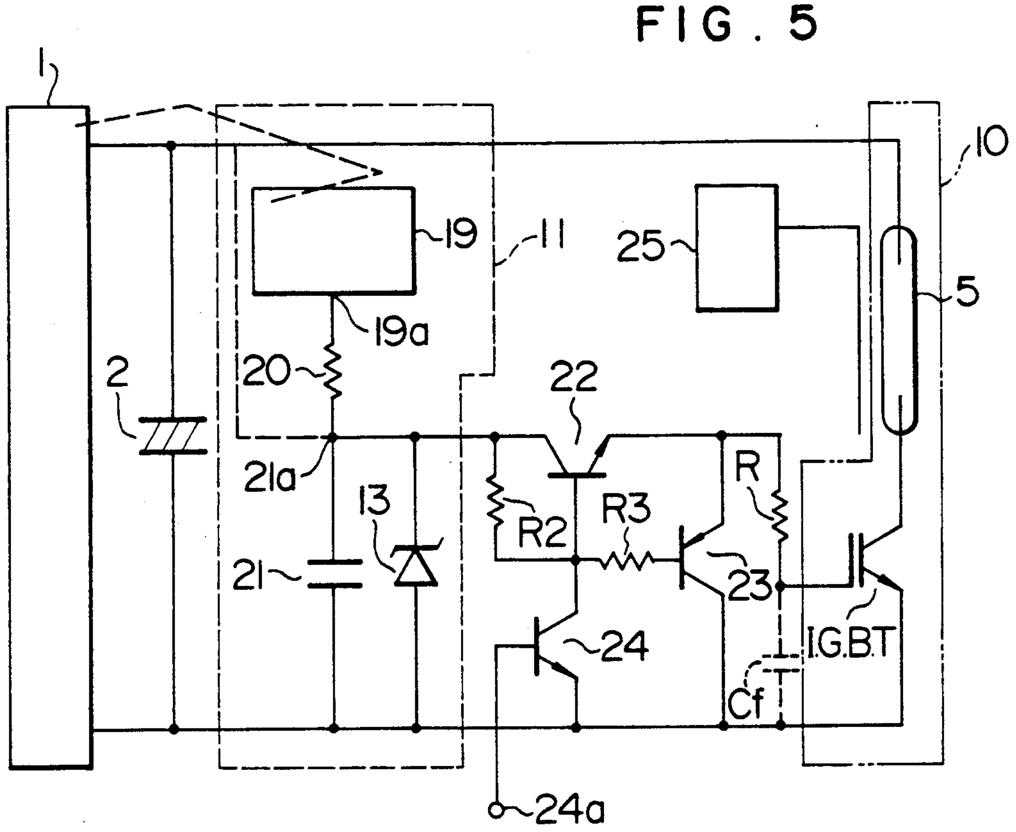
FIG. 5 is an electric circuit diagram showing the fourth embodiment of a flash unit according to the present invention.
Figure 6:
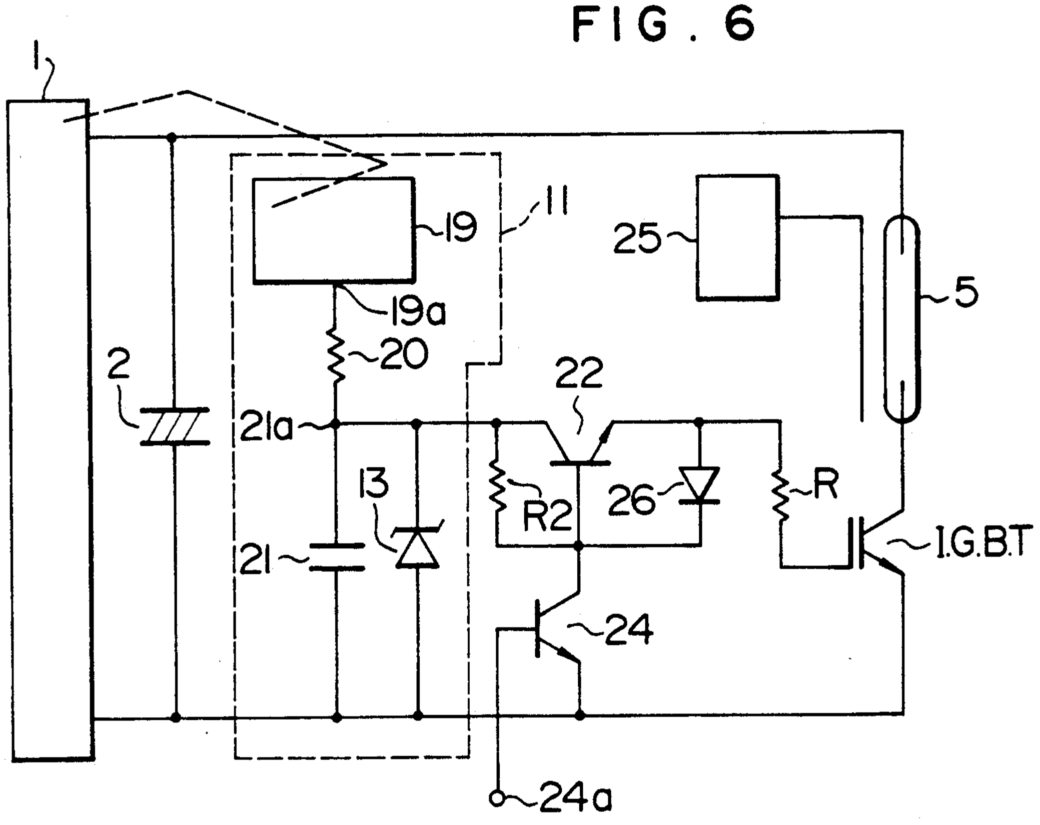
FIG. 6 is an electric circuit digram showing the fifth embodiment of a flash unit according to the present invention.
Figure 7:
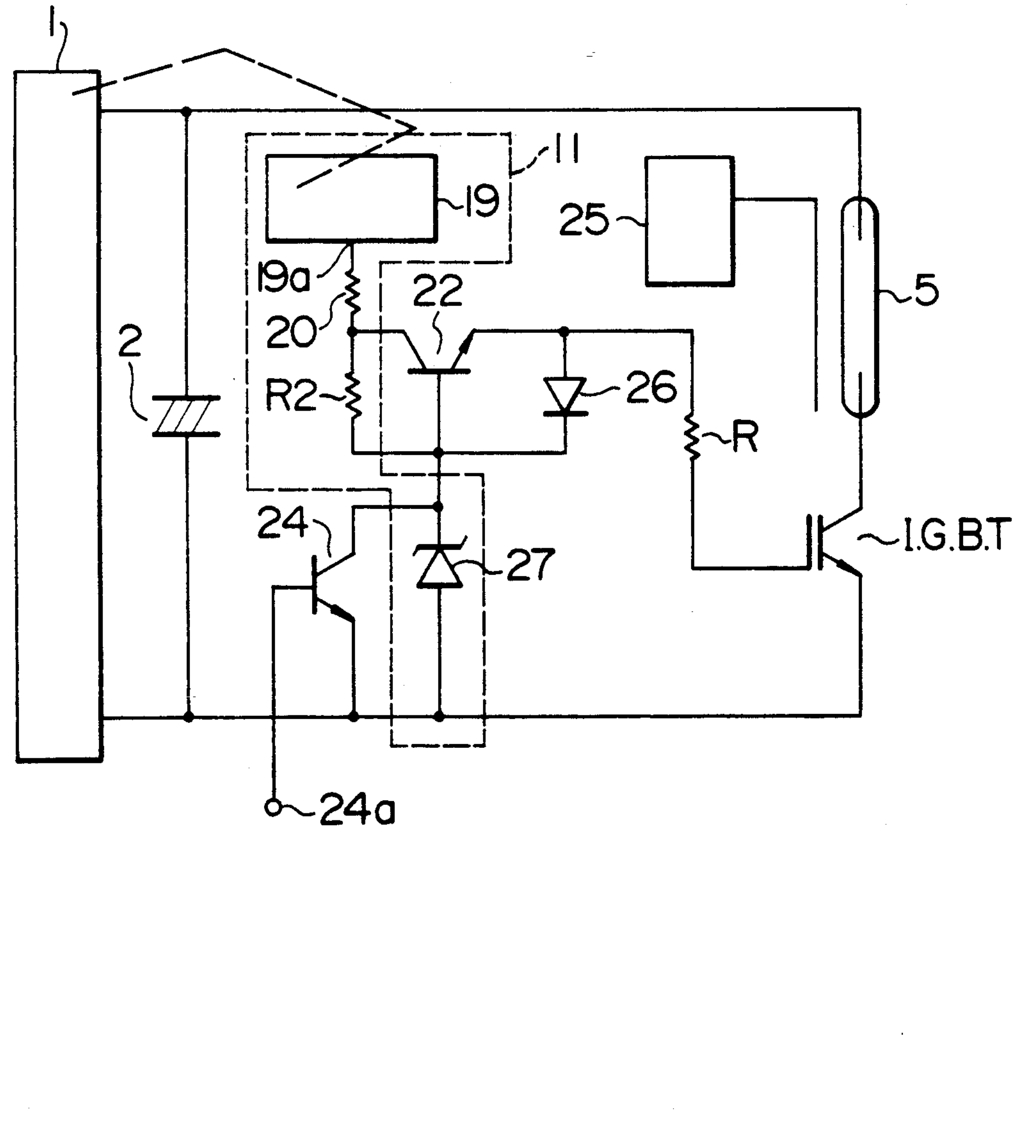
FIG. 7 is an electric circuit diagram showing the sixth embodiment of a flash unit according to the present invention.

Respective embodiments of flash units shown in FIGS. 5, 6 and 7 have been proposed considering the above condition of the high speed repetitive light-emission operation. It should be noted that in these embodiments, the driving votlage is quickly applied to the gate of the IGBT to improve the switching characteristic relative to the IGBT.

Embodiment 4

FIG. 5 is a circuit diagram showing the fourth embodiment of the flash unit according to the present invention. In FIG. 5, the same reference numerals refer to the same elements as in FIG. 1.

The arrangement of the circuit according to this embodiment is as follows. Connected across the DC high voltage power source 1 are the main capacitor 2 and the series connection 10 of the flash tube 5 and the IGBT. The voltage applying means 11 is composed of a driving power source 19 which starts to operate in synchronism with the operation start of the DC high voltage power source 1 thereby to produce an appropriate voltage, a resistor 20 connected with the output terminal 19*a* of the power source 19, a capacitor 21 for the power source and the Zener diode 13 for controlling the charging voltage of the capacitor 21 to a predetermined value. The higher potential terminal 21*a* of the capacitor 21 is connected with the gate of the IGBT through the main poles (collector-emitter) of a transistor 22 and the gate resistor R. The collector of the transistor 22 is connected with its base through a base resistor R2, the base of the transistor 22 is connected with the base of a transistor 23 through a gate resistor R3; and the main poles (emitter-collector) of the transistor 23 are respectively connected between the gate through a gate resistor R and the emitter of the IGBT. Further, the main poles (collector-emitter) of a transistor 24 are respectively connected between the base of the transistor 22 and the emitter of the IGBT. A trigger circuit section 25 is a known circuit comprising both SCR 14 (trigger switch) and trigger circuit 14 as shown in FIG. 1, and having a function of operating in response to a light-emission starting signal to excite the flash tube 5.

The operation of the circuit shown in FIG. 5 according to this embodiment will be explained.

Now it is assumed that the DC high voltage power source 1 starts to operate by closing an optional switch (not shown). Then, a DC high voltage produced from the power source 1 starts to charge the main capacitor 2 and other capacitors. At the same time, the driving power source 19 also starts to operate so that the capacitor 21 is charged, through the resistor 20, to a voltage determined by the Zener diode 13. Then, a current flows through the base resistor R2, the base-emitter of the transistor 22, the gate resistor R and the gate-emitter of the IGBT so that the transistor 22 turns on. Thus, the predetermined charging voltage across the capacitor 21 is applied to the gate-emitter of the IGBT through the transistor 22 and the resistor R so that the input capacitance Cf parasitic between the gate and emitter of the IGBT indicated by a broken line in FIG. 5 will be charged. As a result, the IGBT enters a conduction standby state.

If, with the main capacitor 2 and other capacitors having been charged, an appropriate light-emission command signal is applied to the trigger circuit section 25, the trigger circuit section 25 will excite the flash discharge tube 5. Then, the IGBT turns on as in the previous embodiments so that the flash tube 5 emits light by consuming the charged energy in the main capacitor 2.

If, at a certain time while the flash tube 5 emits light, a light-emission stopping command signal is applied to the base 24*a* of the transistor 24 from a photometer circuit (not shown), for instance, the transistor 24 remains 'on' for a period during which the signal is applied. The respective bases of the transistors 22 and 23, therefore, are placed in a low level state so that the transistor 22 turns off and the transistor 23 becomes an active state. Turn-off of the transistor 22 stops the application of the driving voltage to the gate of the IGBT. Also, the transistor 23 remains 'on' while the input capacitance Cf discharge the charged energy so the gate-emitter of the IGBT is short-circuited through the resistor R and transistor 23. Then, the IGBT turns off. This interrupts the discharging current which has been flowing through the flash tube 5 so that the flash tube 5 stops emitting light.

Thereafter, if the light-emission stopping command signal disappears at the time when an appropriate time has elapsed, the transistor 24 will return from 'on' to 'off'. Then, the transistor 23 is changed from its active state to 'off', and the transistor 22 is changed from 'off' to 'on'. As a result, short-circuiting between the gate and the emitter of the IGBT is released, and also the driving voltage is applied to the gate of the IGBT. Namely, the flash unit returns to the initial state after the light-emission; at this time, one round of the light-emission operation is completed.

Meanwhile, in this embodiment, application of the driving voltage, to the gate of the IGBT from the capacitor 2 due to turn-on of the transistor 24 is done through only the transistor 22 and the gate resistor R. In other words, no resistor having a high resistance, such as the resistor 12 shown in FIG. 1 which is used for efficiently using energy, is used. As a result, the input capacitance parasitic on the IGBT is charged with a very small time constant; advantageously, this results in a very steep rising characteristic in applying the driving voltage to the gate of the IGBT.

On the other hand, in the operation of stopping the light-emission, the purpose of efficiently using energy without wasting it can be attained by using the gate resistor R2 which is connected with the power supply capacitor 21 only when the transistor 24 is 'on' Since the gate resistor R2 can have a high resistance to supply a base current to the transistor 22, the resistor R2 can attain the above purpose.

Further, the resistor 20 connected with the driving power source 19 can be omitted as long as the transistor 22 has a high withstand voltage. Moreover, as indicated by a broken line in FIG. 5, the power supply capacitor 21 may be directly connected with the main capacitor 2; namely, the main capacitor 2 can be used as the driving power source 19.

Embodiment 5

FIG. 6 is a circuit diagram showing the fifth embodiment of the flash unit according to the present invention. In FIG. 6, the same reference numerals refer to the same elements as in FIG. 5.

As seen from FIG. 6, in this embodiment, a diode 26 is substituted for the transistor 23 and the gate resistor R3 which are used to short-circuit the gate-emitter of the IGBT. The operation of the flash light in this embodiment, therefore, is different from the embodiment of FIG. 5 only in the manner of short-circuiting the gate-emitter of the IGBT.

In operation, when the DC high voltage power source 1 operates to start to charge the main capacitor 2 and other capacitors, the driving power source 19 also operates to produce an output voltage which is in turn applied to the gate of the IGBT. Thus, the IGBT is placed in a conduction standby state.

If the trigger circuit section 25 operates under the state where the main capacitor 2 and other capacitors have been charged, the flash tube 5 emits light by consuming the charged energy in the main capacitor 2.

If, in the course of light-emission, a light-emission stopping command signal is supplied to the base 24*a* of the transistor 24, the transistor 24 turns on and the transistor 22 turns off. Therefore, application of the charged energy in the power supply capacitor 21 to the gate of the IGBT is stopped, and also the gate-emitter of the IGBT is short-circuited through the diode 26. Then, the flash tube 5 stops the light-emission.

When the light-emission stopping command signal disappears, the flash unit returns to an initial state, or a state before the light-emission; at this time, one round of the light-emission operation is completed. In this returning operation, the input capacitance parasitic on the IGBT will be charged for a very short time in the same manner as described in the embodiment of FIG. 5. Additionally, as in the embodiment of FIG. 5, also in this embodiment, if the case permits, the resistor 20 may be omitted, and the main capacitor 2 may be used as the driving power source 19.

Embodiment 6

FIG. 7 is a circuit diagram showing the sixth embodiment of the flash unit according to the present invention. In FIG. 7, the same reference numerals refer to the same elements as in FIG. 6.

As seen from FIG. 7, in this embodiment, the power supply capacitor 21 which has been used in the respective embodiments of FIGS. 5 and 6 is removed, and a Zener diode 27 that is a constant voltage device is connected between the base of the transistor 22 and the emitter of the IGBT, i.e. between the collector and the emitter of the transistor 24. The operation of the flash light in this embodiment, therefore, is different from the embodiment of FIG. 6 only in the manner of applying a voltage to the gate of the IGBT.

In operation, when the DC high voltage power source 1 operates to start to charge the main capacitor 2 and other capacitors, the driving power source 19 also operates to produce an output voltage which is in turn applied to the Zener diode 27 through the resistor 20 and the base resistor R2. Thus, a predetermined voltage is produced across the Zener diode 27. Then, the transistor 22 turns on so that the predetermined voltage across the Zener diode 27 is applied to the gate of the IGBT. As a result, the IGBT is placed in a conduction standby state.

If the trigger circuit section 25 operates under the state where the main capacitor 2 and other capacitors have been charged, the flash tube 5 emits light by consuming the charged energy in the main capacitor 2.

If, in the course of the light-emission, a light-emission stopping command signal is supplied to the base 24*a* of the transistor 24, the transistor 24 turns on, and the transistor 22 turns off. Therefore, application of the charged energy of the power supply capacitor 21 to the gate of the IGBT is stopped, and also the gate-emitter of the IGBT is short-circuited through the diode 26. Then, the flash tube 5 stops the light-emission.

When the light-emission stopping command signal disappears, the flash unit returns to an initial state, or a state before the light-emission; at this time, one round of the light-emission operation is completed. In this returning operation, the input capacitance parasitic on the IGBT will be charged for a very short time by applying the predetermined voltage produced across the Zener diode 27 to the gate of the IGBT. Additionally, as in the embodiments of FIGS. 5 and 6, also in this embodiment, if the case permits, the resistor 20 may be omitted, and the main capacitor 2 may be used as the driving power source 19.

As described above, in the flash unit according to each of the embodiments of FIGS. 5 to 7, a predetermined voltage is applied to the gate of the IGBT without passing through the resistor having a high resistance so that a small charging time constant of the input capacitance parasitic on the IGBT can be realized. Accordingly, a steep switching characteristic of voltage application to the IGBT, can be obtained and a high speed repetitive light-emission operation can be attained in a stabilized manner.

We claim:

1. A flash unit comprising:

a DC high voltage power source;

a main capacitor which is connected across said DC high voltage power source and charged by said DC high voltage power source;

a series connection of an insulated gate bipolar transistor (IGBT) and a flash tube connected in series, said series connection being connected across said main capacitor;

voltage applying means for applying a driving voltage to the gate of the IGBT, said voltage applying means operating in response to supplying of power from said DC high voltage power source to said main capacitor;

a trigger switch having a control pole to which a light-emission command signal is supplied and a lower potential side terminal connected with a junction to which the flash tube and IGBT are connected;

a trigger circuit for exciting the flash tube in response to the operation of said trigger switch; and a control switch having a control pole to which a light-emission stopping command signal is supplied, and main poles thereof being respectively connected to the gate and emitter of the IGBT.

2. A flash unit according to claim 1, wherein said voltage applying means is a series connection of a resistor and a constant voltage device connected in series, said series connection being connected across said main capacitor.

3. A flash unit according to claim 1, wherein said voltage applying means is a constant voltage circuit for generating a predetermined constant voltage in response to the operation of said DC high voltage power source.

4. A flash unit according to claim 1, wherein said voltage applying means comprises an arrangement of switches which operate in response to respective elapses of a predetermined time after said voltage applying means has started to operate and stopped to operate.

5. A flash unit according to claim 2, wherein said voltage applying means comprises an arrangement of switches which operate in response to respective elapses of a predetermined time after said voltage applying means has started to operate and stopped to operate.

6. A flash unit according to claim 3, wherein said voltage applying means comprises an arrangement of switches which operate in response to respective elapses of a predetermined time after said voltage applying means has started to operate and stopped to operate.

7. A flash unit comprising:

a DC high voltage power source;

a main capacitor which is connected across said DC high voltage power source and charged by said DC high voltage power source;

a first series connection of an insulated gate bipolar transistor (IGBT), a diode and a flash tube connected in series, said series connection being connected across said main capacitor;

voltage applying means for applying a driving voltage of the gate of the IGBT, said voltage applying means operating in response to supplying of power from said DC high voltage power source to said main capacitor;

a trigger switch having a control pole to which a light-emission command signal is supplied, and a lower potential side terminal connected with a junction to which the diode and IGBT are connected;

a trigger circuit for exciting the flash tube in response to the operation of said trigger switch;

a second series connection of a double voltage capacitor and a resistor connected in series across said flash tube; and a control switch having a control pole to which a light-emission stopping command signal is supplied, and main poles thereof being respectively connected to the gate and emitter of the IGBT.

8. A flash unit accoridng to claim 7, wherein said voltage applying means is a series connection of a resistor and a constant voltage device connected in series, said series connection being connected across said main capacitor.

9. A flash unit according to claim 7, wherein said voltage applying means is a constant voltage circuit for generating a predetermined constant voltage in response to the operation of said DC high voltage power source.

10. A flash unit according to claim 7, wherein said voltage applying means comprises an arrangement of switches which operate in response to respective elapses of a predetermined time after said voltage applying means has started to operate and stopped to operate.

11. A flash unit according to claim 8, wherein said voltage applying means comprises an arrangement of switches which operate in response to respective elapses of a predetermined time after said voltage applying means has started to operate and stopped to operate.

12. A flash unit according to claim 9, wherein said voltage applying means comprises an arrangement of switches which operate in response to respective elapses of a predetermined time after said voltage applying means has started to operate and stopped to operate.

13. A flash unit comprising:

a DC high voltage power source;

a main capacitor which is connected across said DC high voltage power source and charged by said DC high voltage power source;

a series connection of an insulated gate bipolar transistor (IGBT) and a flash tube connected in series, said series connection being connected across said main capacitor;

a driving power source for producing a driving voltage in response to the start of operation of said DC high voltage power source;

a parallel connection of a power source capacitor as a driving power source and a constant voltage device connected in parallel across the voltage output terminal of said driving power source and the emitter of the IGBT;

a first transistor having main poles respectively connected to a higher potential side terminal and the gate of the IGBT;

gate means for turning on said first transistor by a charged energy in the power source capacitor;

a second transistor having its base connected with the base of said first transistor and main poles respectively connected to the gate and emitter of the IGBT;

a control switch having a control pole to which a light-emission stopping command signal is supplied, and main poles respectively connected to the base of said first transistor and the emitter of the IGBT, said control switch normally being kept in an off-state to keep the IGBT turned on by allowing power supplied from said power source capacitor by way of said first transistor, said first transistor being kept turned on by said control switch, said control switch turned to an on-state upon receiving said light-emission stopping command to cause said first transistor and the IGBT to be turned off and said second transistor turned on; and a trigger circuit for exciting the flash tube.

14. A flash unit comprising:

a DC high voltage power source;

a main capacitor which is connected across said DC high voltage power source and charged by said DC high voltage power source;

a series connection of an insulated gate bipolar transistor (IGBT) and a flash tube connected in series, said series connection being connected across said main capacitor;

a driving power source for producing, in response to the start of the operation of said DC high voltage power source, a driving voltage to be applied to the gate of the IGBT;

a parallel connection composed of a power source capacitor for the driving power source and a constant voltage device connected in parallel between the voltage output terminal of said driving power source and the emitter of the IGBT;

a transistor having main poles respectively connected to a higher potential side terminal of the power source capacitor and the gate of the IGBT;

gate means for turning on said first transistor by a charged energy in the power source capacitor;

a diode having an anode connected with the gate of the IGBT and a cathode connected with the base of said transistor;

a control switch having a control pole to which a light-emission stopping command signal is supplied, and main poles respectively connected to the base of said transistor and the emitter of the IGBT; and a trigger circuit for exciting the flash tube.

15. A flash unit comprising:

a DC high voltage power source;

a main capacitor which is connected across said DC high voltage power source and charged by said DC high voltage power source;

a series connection of an insulated gate bipolar transistor (IGBT) and a flash tube connected in series, said series connection being connected across said main capacitor;

a driving power source for producing a driving voltage, in response to the start of the operation of said DC high voltage power source;

a transistor having main poles respectively connected to a voltage output terminal of said driving power source and the gate of the IGBT;

gate means for turning on said first transistor by an output voltage from said driving power source;

a constant voltage device connected between the base of said transistor and the emitter of the IGBT;

a diode having an anode connected with the gate of the IGBT and a cathode connected with the base of said transistor;

a control switch having a control pole to which a light-emission stopping command signal is supplied, and main poles respectively connected across said constant voltage device; and a trigger circuit for exciting the flash tube.

* * * * *